US012260851B2

(12) United States Patent
Finkelstein et al.

(10) Patent No.: US 12,260,851 B2
(45) Date of Patent: Mar. 25, 2025

(54) TWO-LEVEL TEXT-TO-SPEECH SYSTEMS USING SYNTHETIC TRAINING DATA

(71) Applicant: Google LLC, Mountain View, CA (US)

(72) Inventors: Lev Finkelstein, Mountain View, CA (US); Chun-an Chan, Mountain View, CA (US); Byungha Chun, Tokyo (JP); Norman Casagrande, London (GB); Yu Zhang, Mountain View, CA (US); Robert Andrew James Clark, Hertfordshire (GB); Vincent Wan, London (GB)

(73) Assignee: Google LLC, Mountain View, CA (US)

( * ) Notice: Subject to any disclaimer, the term of this patent is extended or adjusted under 35 U.S.C. 154(b) by 188 days.

(21) Appl. No.: 17/305,809

(22) Filed: Jul. 14, 2021

(65) Prior Publication Data

US 2023/0018384 A1 Jan. 19, 2023

(51) Int. Cl.
*G10L 13/00* (2006.01)
*G10L 13/047* (2013.01)
*G10L 13/08* (2013.01)

(52) U.S. Cl.
CPC ............ *G10L 13/08* (2013.01); *G10L 13/047* (2013.01)

(58) Field of Classification Search
CPC ...... G10L 13/08; G10L 13/047; G10L 13/033
See application file for complete search history.

(56) References Cited

U.S. PATENT DOCUMENTS 11,410,684 B1 * 8/2022 Klimkov ................ G10L 25/78
2020/0410976 A1 * 12/2020 Zhou ..................... G06N 3/048
(Continued)

FOREIGN PATENT DOCUMENTS

WO WO-2021183229 A1 * 9/2021 ........... G10L 13/027

OTHER PUBLICATIONS

Hwang MJ, Yamamoto R, Song E, Kim JM. TTS-by-TTS: TTS-driven Data Augmentation for Fast and High-Quality Speech Synthesis. arXiv preprint arXiv:2010.13421. Oct. 26, 2020. (Year: 2020).*
(Continued)

*Primary Examiner* — Douglas Godbold
*Assistant Examiner* — Parker Mayfield
(74) *Attorney, Agent, or Firm* — Honigman LLP; Brett A. Krueger; Grant Griffith

(57) ABSTRACT

A method includes obtaining training data including a plurality of training audio signals and corresponding transcripts. Each training audio signal is spoken by a target speaker in a first accent/dialect. For each training audio signal of the training data, the method includes generating a training synthesized speech representation spoken by the target speaker in a second accent/dialect different than the first accent/dialect and training a text-to-speech (TTS) system based on the corresponding transcript and the training synthesized speech representation. The method also includes receiving an input text utterance to be synthesized into speech in the second accent/dialect. The method also includes obtaining conditioning inputs that include a speaker embedding and an accent/dialect identifier that identifies the second accent/dialect. The method also includes generating an output audio waveform corresponding to a synthesized speech representation of the input text sequence that clones the voice of the target speaker in the second accent/dialect.

27 Claims, 9 Drawing Sheets

(56) References Cited

U.S. PATENT DOCUMENTS

| | | | | |
|---|---|---|---|---|
| 2021/0097976 | A1* | 4/2021 | Chicote | G10L 13/10 |
| 2022/0157329 | A1* | 5/2022 | Choi | G06N 3/045 |
| 2022/0230623 | A1* | 7/2022 | Byun | G10L 13/033 |
| 2023/0118412 | A1* | 4/2023 | Gao | G10L 15/22<br>704/231 |

OTHER PUBLICATIONS

International Search Report and Written Opinion for the related Application No. PCT/US2022/073390, dated Oct. 27, 2022, 30 pages.

Erica Cooper et al: "Can Speaker Augmentation Improve Multi-Speaker End-to-End TIS?", arxiv.org, Cornell University Library, 201 Olin Library Cornell University Ithaca, NY 14853, Aug. 7, 2020 (Aug. 7, 2020), XP081735382, 5 pages.

Min-Jae Hwang et al: "TTS-by-TTS: TTS-driven Data Augmentation for Fast and High-Quality Speech Synthesis", arxj:v. org, Cornell University Library, 201 Olin Library Cornell University Ithaca, NY 14853, Oct. 26, 2020 (Oct. 26, 2020), XP081798160, figure 1, section 3, 5 pages.

Yo Zhang et al: "Learning to Speak Fluently in a Foreign Language: Multilingual Speech Synthesis and Cross-Language Voice Cloning", arxiv.org, Cornell University Library, 201 Olin Library Cornell University Ithaca, NY 14853, Jul. 10, 2019 (Jul. 10, 2019), XP081440090, figure 1, section 2, 5 pages.

* cited by examiner

TWO-LEVEL TEXT-TO-SPEECH SYSTEMS USING SYNTHETIC TRAINING DATA

TECHNICAL FIELD

This disclosure relates to two-level text-to-speech systems using synthetic training data.

BACKGROUND

Speech synthesis systems use speech models to generate synthesized audio from textual and/or audio inputs, and are becoming increasingly popular on mobile devices. A variety of different speech models exist each including unique efficiencies and capabilities, such as speaking styles, prosodies, languages, accents, etc. It may be useful in some scenarios to implement one of these developed capabilities on another speech model. However, the particular training data required to train the speech model may not be available. In other instances, it may be useful to transfer one or more of these capabilities between speech models. Here, however, transferring capabilities between speech models may be particularly difficult because of the significant development costs, architectural constraints, and/or design limitations of certain speech models.

SUMMARY

One aspect of the disclosure provides a computer-implemented method that when executed on data processing hardware causes the data processing hardware to perform operations. The operations include obtaining training data including a plurality of training audio signals and corresponding transcripts. Each training audio signal corresponds to a reference utterance spoken by a target speaker in a first accent/dialect. Each transcript includes a textual representation of the corresponding reference utterance. For each training audio signal of the training data, the operations include generating, by a trained voice cloning system configured to receive the training audio signal corresponding to the reference utterance spoken by the target speaker in the first accent/dialect as input, a training synthesized speech representation of the corresponding reference utterance spoken by the target speaker. The training synthesized speech representation includes a voice of the target speaker in a second accent/dialect different than the first accent/dialect. Here, for each training audio signal of the training data, the operations also include training a text-to-speech (TTS) system based on the corresponding transcript of the training audio signal and the training synthesized speech representation of the corresponding reference utterance generated by the trained voice cloning system. The operations also include receiving an input text utterance to be synthesized into speech in the second accent/dialect. The operations also include obtaining conditioning inputs that include a speaker embedding that represents voice characteristics of the target speaker and an accent/dialect identifier that identifies the second accent/dialect. The operations also include generating, using the trained TTS system conditioned on the obtained conditioning inputs, and by processing the input text utterance, an output audio waveform that corresponds to a synthesized speech representation of the input text utterance that clones the voice of the target speaker in the second accent/dialect.

Implementations of the disclosure may include one or more of the following optional features. In some implementations, training the TTS system includes training an encoder portion of a TTS model of the TTS system to encode the training synthesized speech representation of the corresponding reference utterance generated by the trained voice cloning system into an utterance embedding representing a prosody captured by the training synthesized speech representation. In these implementations, training the TTS system also includes training, using the corresponding transcript of the training audio signal, a decoder portion of the TTS system by decoding the utterance embedding to generate a predicted output audio signal of expressive speech. In some examples, training the TTS system further includes: training, using the predicted output audio signal, a synthesizer of the TTS system to generate a predicted synthesized speech representation of the input text utterance that clones the voice of the target speaker in the second/accent dialect and has the prosody represented by the utterance embedding; generating gradients/losses between the predicted synthesized speech representation and the training synthesized speech representation; and back-propagating the gradients/losses through the TTS model and the synthesizer.

The operations may further include sampling, from the training synthesized speech representation, a sequence of fixed-length reference frames providing reference prosodic features that represent the prosody captured by the training synthesized speech representation. Here, training the encoder portion of the TTS model includes training the encoder portion to encode the sequence of fixed-length reference frames sampled from the training synthesized speech representation into the utterance embedding. In some implementations, training the decoder portion of the TTS model includes decoding, using the corresponding transcript of the training audio signal, the utterance embedding into a sequence of fixed-length predicted frames that provide predicted prosodic features for the transcript that represent the prosody represented by the utterance embedding. Optionally, the TTS model may be trained so that a number of fixed-length predicted frames decoded by the decoder portion is equal to a number of fixed-length reference frames sampled from the training synthesized speech representation.

In some implementations, the training synthesized speech representation of the reference utterance includes an audio waveform or a sequence of mel-frequency spectrograms. The trained voice cloning system may be further configured to receive the corresponding transcript of the training audio signal as input when generating the training synthesized speech representation. In some examples, the training audio signal corresponding to the reference utterance spoken by the target speaker includes an input audio waveform of human speech, the training synthesized speech representation includes an output audio waveform of synthesized speech that clones the voice of the target speaker in the second accent/dialect, and the trained voice cloning system includes an end-to-end neural network configured to convert input audio waveforms directly into corresponding output audio waveforms.

In some implementations, the TTS system includes a TTS model conditioned on the conditioning inputs and configured to generate an output audio signal of expressive speech by decoding, using the input text utterance, an utterance embedding into a sequence of fixed-length predicted frames providing prosodic features. The utterance embedding is selected to specify an intended prosody for the input text utterance and the prosodic features represent the intended prosody specified by the utterance embedding. In these implementations, the TTS system also includes a waveform synthesizer configured to receive, as input, the sequence of fixed-length predicted frames and generate, as output, the output audio waveform corresponding to the synthesized speech representation of the input text utterance that clones the voice of the target speaker in the second accent/dialect. The prosodic features that represent the intended prosody may include duration, pitch contour, energy contour, and/or mel-frequency spectrogram contour.

Another aspect of the disclosure provides a system that includes data processing hardware and memory hardware storing instructions that when executed on the data processing hardware cause the data processing hardware to perform operations. The operations include obtaining training data including a plurality of training audio signals and corresponding transcripts. Each training audio signal corresponds to a reference utterance spoken by a target speaker in a first accent/dialect. Each transcript includes a textual representation of the corresponding reference utterance. For each training audio signal of the training data, the operations include generating, by a trained voice cloning system configured to receive the training audio signal corresponding to the reference utterance spoken by the target speaker in the first accent/dialect as input, a training synthesized speech representation of the corresponding reference utterance spoken by the target speaker. The training synthesized speech representation includes a voice of the target speaker in a second accent/dialect different than the first accent/dialect. Here, for each training audio signal of the training data, the operations also include training a text-to-speech (TTS) system based on the corresponding transcript of the training audio signal and the training synthesized speech representation of the corresponding reference utterance generated by the trained voice cloning system. The operations also include receiving an input text utterance to be synthesized into speech in the second accent/dialect. The operations also include obtaining conditioning inputs that include a speaker embedding that represents voice characteristics of the target speaker and an accent/dialect identifier that identifies the second accent/dialect. The operations also include generating, using the trained TTS system conditioned on the obtained conditioning inputs, and by processing the input text utterance, an output audio waveform that corresponds to a synthesized speech representation of the input text utterance that clones the voice of the target speaker in the second accent/dialect.

Implementations of the disclosure may include one or more of the following optional features. In some implementations, training the TTS system includes training an encoder portion of a TTS model of the TTS system to encode the training synthesized speech representation of the corresponding reference utterance generated by the trained voice cloning system into an utterance embedding representing a prosody captured by the training synthesized speech representation. In these implementations, training the TTS system also includes training, using the corresponding transcript of the training audio signal, a decoder portion of the TTS system by decoding the utterance embedding to generate a predicted output audio signal of expressive speech. In some examples, training the TTS system further includes: training, using the predicted output audio signal, a synthesizer of the TTS system to generate a predicted synthesized speech representation of the input text utterance that clones the voice of the target speaker in the second/accent dialect and has the prosody represented by the utterance embedding; generating gradients/losses between the predicted synthesized speech representation and the training synthesized speech representation; and back-propagating the gradients/losses through the TTS model and the synthesizer.

The operations may further include sampling, from the training synthesized speech representation, a sequence of fixed-length reference frames providing reference prosodic features that represent the prosody captured by the training synthesized speech representation. Here, training the encoder portion of the TTS model includes training the encoder portion to encode the sequence of fixed-length reference frames sampled from the training synthesized speech representation into the utterance embedding. In some implementations, training the decoder portion of the TTS model includes decoding, using the corresponding transcript of the training audio signal, the utterance embedding into a sequence of fixed-length predicted frames that provide predicted prosodic features for the transcript that represent the prosody represented by the utterance embedding. Optionally, the TTS model may be trained so that a number of fixed-length predicted frames decoded by the decoder portion is equal to a number of fixed-length reference frames sampled from the training synthesized speech representation.

In some implementations, the training synthesized speech representation of the reference utterance includes an audio waveform or a sequence of mel-frequency spectrograms. The trained voice cloning system may be further configured to receive the corresponding transcript of the training audio signal as input when generating the training synthesized speech representation. In some examples, the training audio signal corresponding to the reference utterance spoken by the target speaker includes an input audio waveform of human speech, the training synthesized speech representation includes an output audio waveform of synthesized speech that clones the voice of the target speaker in the second accent/dialect, and the trained voice cloning system includes an end-to-end neural network configured to convert input audio waveforms directly into corresponding output audio waveforms.

In some implementations, the TTS system includes a TTS model conditioned on the conditioning inputs and configured to generate an output audio signal of expressive speech by decoding, using the input text utterance, an utterance embedding into a sequence of fixed-length predicted frames providing prosodic features. The utterance embedding is selected to specify an intended prosody for the input text utterance and the prosodic features represent the intended prosody specified by the utterance embedding. In these implementations, the TTS system also includes a waveform synthesizer configured to receive, as input, the sequence of fixed-length predicted frames and generate, as output, the output audio waveform corresponding to the synthesized speech representation of the input text utterance that clones the voice of the target speaker in the second accent/dialect. The prosodic features that represent the intended prosody may include duration, pitch contour, energy contour, and/or mel-frequency spectrogram contour.

Another aspect of the present disclosure provides a computer implemented method that when executed on data processing hardware causes the data processing hardware to perform operations that include obtaining training data including a plurality of text utterances. For each training text utterance of the training data, the operations also include generating, by a trained voice cloning system configured to receive the training text utterance as input, a training synthesized speech representation of the corresponding training text utterance, and training, based on the corresponding training text utterance and the training synthesized speech representation generated by the trained voice cloning system, a text-to-speech (TTS) system to learn how to generate synthesized speech having a target speech characteristic. The training synthesized speech representation is in a voice of a target speaker and has the target speech characteristic. The operations also include receiving an input text utterance to be synthesized into speech having the target speech characteristic, and generating, using the trained TTS system a synthesized speech representation of the input text utterance, the synthesized speech representation having the target speech characteristic.

Implementations of the disclosure may include one or more of the following optional features. In some implementations, the operations further include obtaining conditioning inputs that include a speaker identifier indicating voice characteristics of the target speaker. Here, when generating the synthesized speech representation of the input text utterance, the trained TTS system is conditioned on the obtained conditioning inputs, and the synthesized speech representation having the target speech characteristic clones the voice of the target speaker. The target speech characteristic may include a target accent/dialect or a target prosody/style. In some examples, when generating the training synthesized speech representation of the corresponding training text utterance, the trained voice cloning system is further configured to receive a speaker identifier indicating voice characteristics of the target speaker.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
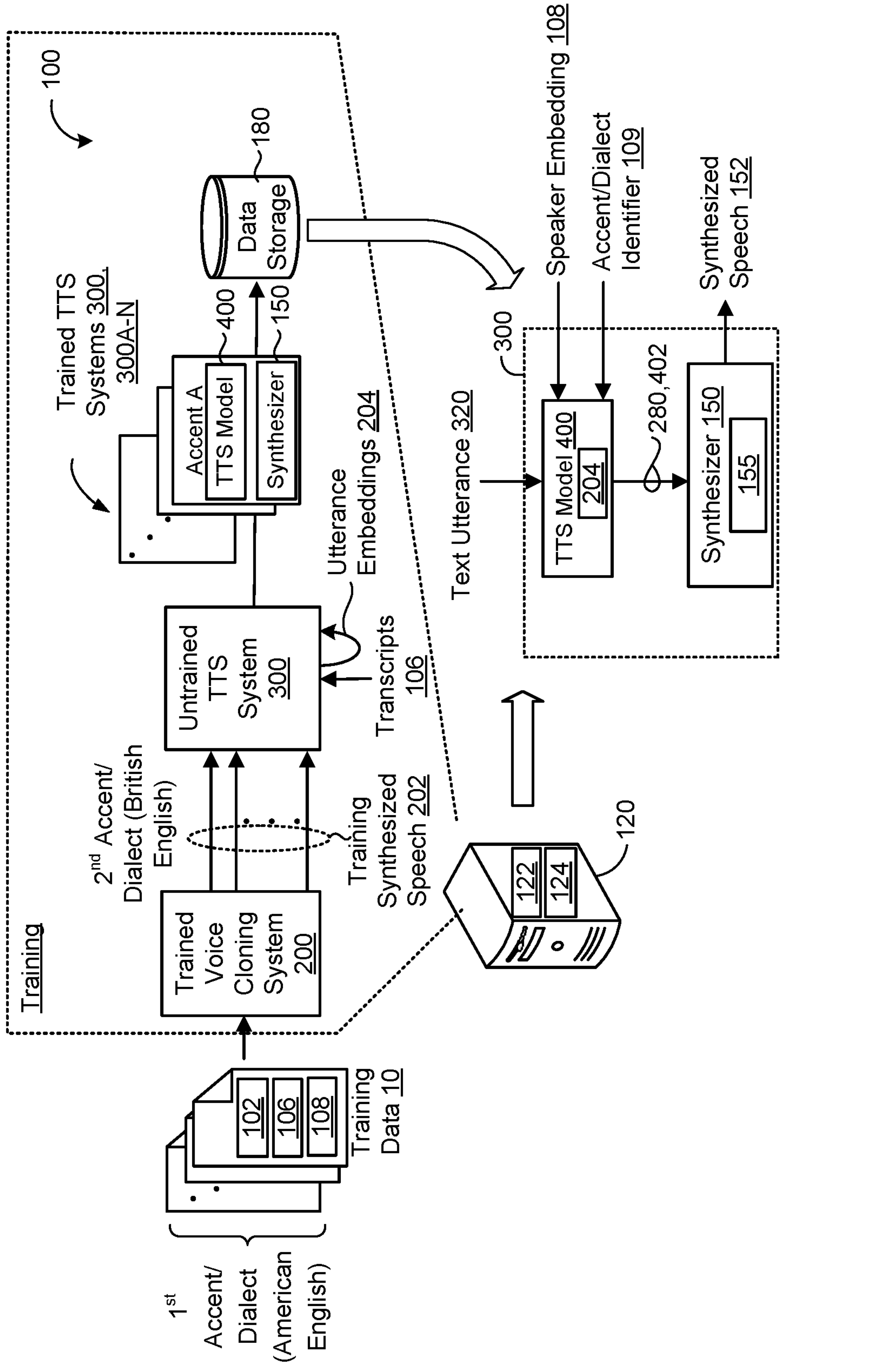
FIG. 1 is a schematic view of an example system for training a text-to-speech system to produce expressive speech that includes a voice of a target speaker in an intended accent/dialect using a trained speech cloning system.

Text-to-speech (TTS) systems, often used by speech synthesis systems, are generally only given text inputs without any reference acoustic representation at runtime, and must impute many linguistic factors that are not provided by the text inputs in order to produce realistically sounding synthesized speech. A subset of these linguistic factors are collectively referred to as prosody and may include intonation (pitch variation), stress (stressed syllables vs. non-stressed syllables), duration of sounds, loudness, tone, rhythm, and style of speech. Prosody may indicate the emotional state of the speech, the form of the speech (e.g., statement, question, command, etc.), the presence of irony or sarcasm of the speech, uncertainty in the knowledge of the speech, or other linguistic elements incapable of being encoded by grammar or vocabulary choice of the input text. The linguistic factors may also convey an accent/dialect associated with how speakers in a particular geographical region pronounce words/terms in a given language. For example, English speakers from Boston, Mass. have a "Boston accent," and pronounce words/terms differently than how English speakers from Fargo, N. Dak. pronounce the same terms. Accordingly, a given text input can produce synthesized speech in a given language across various different accents/dialects and/or different speaking styles, as well as produce synthesized speech across different languages.

In some instances, TTS systems are trained using human speech spoken by one or more target speakers. For example, each target speaker may be a professional voice actor that speaks with a particular style and in a particular accent/dialect (e.g., American English accent) native to the target speaker. Using a corpus of training utterances spoken by a target speaker (e.g., professional advertisement reader), TTS systems can learn to generate synthesized speech that matches the voice, speaking style, and accent/dialect associated with the target speaker. In some situations, it may be useful for the TTS system to generate synthesized speech that clones the voice of the target speaker but in a different speaking style and/or accent/dialect than the speaking style and/or accent/dialect native to the target speaker. Returning to the example where the target speaker includes a professional voice actor who speaks with an American English accent, it may be desirable for the TTS system to generate synthesized speech that includes the voice of the voice actor (e.g., target speaker) but in a British English accent. Here, the TTS system will not be able generate the synthesized speech that clones the voice of the target speaker in the British English accent unless the TTS system was trained on reference utterances spoken by the target speaker in the British English accent. Moreover, the professional voice actor who natively speaks in the American English accent may not be able to produce speech that accurately pronounces/enunciates terms associated with the British English accent, leaving no ability to even train the TTS system on reference utterances spoken by the voice actor in the British English accent. This inability to attain sufficient training data is further compounded in situations when it is desirable for the TTS system to generate synthesized speech that clones the voice of a target speaker across multiple different accents/dialects, none of which, are native to the voice actor.

Implementations herein are directed toward leveraging a trained voice cloning system to generate training synthesized speech representations that clone a voice of a target speaker in a target accent/dialect that the target speaker does not natively speak and using the training synthesized speech representations to train a TTS system to learn to produce synthesized expressive speech that clones the voice of the targets speaker in the target accent/dialect. More specifically, the trained voice cloning system obtains training data including a plurality of training audio signals and corresponding transcripts, whereby each training audio signal corresponds to a reference utterance spoken by the target speaker in a first accent/dialect native to the target speaker.

For each training audio signal, the trained voice cloning system generates a training synthesized speech representation of the of the corresponding reference utterance spoken by the target speaker. Here, the training synthesized speech representation includes the voice of the target speaker in a second accent/dialect different than the first accent/dialect. That is, the training synthesized speech representation is associated with a different accent/dialect than the first accent/dialect associated with the reference utterance spoken by the target speaker.

An untrained TTS system trains on the transcript of the training audio signal and the training synthesized speech representation to learn how to generate synthesized speech that clones the voice of the target speaker in the second accent/dialect. That is, in the untrained state, the TTS system is unable to transfer the voice of the target speaker across different accents/dialects in synthesized speech generated from input text. However, after leveraging the voice cloning system to produce training synthesized speech representations that clone the voice of the target speaker in a different accent/dialect and using the training synthesized speech representations to train the TTS system, the trained TTS system can be employed during inference to convert an input text utterance into corresponding synthesized expressive speech cloning the voice of the target speaker in the second accent/dialect. Here, during inference, the trained TTS system may receive conditioning inputs that include a speaker embedding representing voice characteristics of the target speaker and an accent/dialect identifier identifying the second accent/dialect so that the TTS system can convert the input text utterance into an output audio waveform that clones the voice of the target speaker in the second accent/dialect.

FIG. 1 shows an example system 100 for training an untrained text-to-speech system (TTS) 300 and executing the trained TTS system 300 to synthesize an input text utterance 320 into expressive speech 152 that includes a voice of a target target speaker in a target accent/dialect. While examples herein are directed toward generating synthesized speech 152 in a particular voice for different accents/dialects, implementations herein can be similarly applied for generating synthesized speech 152 in the particular voice for different speaking styles in addition to, or in lieu of, different accents/dialects. The system 100 includes a computing system (interchangeable referred to as 'computing device') 120 having data processing hardware 122 and memory hardware 124 in communication with the data processing hardware 122 and storing instructions executable by the data processing hardware 122 to cause the data processing hardware 122 to perform operations.

In some implementations, the computing system 120 (e.g., data processing hardware 122) provides a trained voice cloning system 200 configured to generate training synthesized speech representations 202 for use in training the untrained TTS system 300. The trained voice cloning system 200 obtains training data 10 that includes a plurality of training audio signals 102 and corresponding transcripts 106. Each training audio signal 102 includes an utterance of human speech spoken by a target speaker in a first accent/dialect. For example, the training audio signals 102 may be spoken by a target speaker in an American English accent. Thus, the first accent/dialect associated with the utterances of human speech spoken by the target speaker may correspond to the native accent/dialect of the target speaker. Each transcript 106 includes a textual representation for each corresponding reference utterance. The training data 10 may also include a plurality of speaker embeddings (also referred to as "speaker identifiers") 108 that each represent speaker characteristics (e.g., native accent, a speaker identifier, male/female, etc.) of the corresponding target speaker. That is, the speaker embedding/identifier 108 may represent speaker characteristics of the target speaker. The speaker embedding/identifier 108 may include a numerical vector representing the speaker characteristics of the target speaker or simply include an identifier associated with the target speaker that instructs the trained voice cloning system 200 to produce the training synthesized speech representation 202 in the voice of the target speaker. In the case of the latter, the speaker identifier may be translated to the corresponding speaker embedding for use by the system 200. In some examples, the trained voice cloning system 200 includes a voice conversion system that converts each training audio signal 102 (e.g., reference utterance of human speech) directly into a corresponding training synthesized speech representation 202. In other examples, the trained voice cloning system 200 includes a text-to-speech voice cloning system that converts the corresponding transcript 106 into a corresponding training synthesized speech representation 106 that clones the voice of the reference utterance in a second accent/dialect different than the first accent/dialect associated with the training audio signal 102.

For simplicity, examples herein are directed toward the trained voice cloning system 200 generating training synthesized speech representations 202 that clone the voice of a target speaker in a target accent/dialect (e.g., second accent/dialect). However, implementations herein are equally applicable to the trained voice cloning system 200 generating training synthesized speech representations 202 that clone the voice of the target speaker and having any target speech characteristic. Thus, the target speech characteristic may include at least one of a target accent/dialect, a target prosody/style, or some other speech characteristic. As will become apparent, the training synthesized speech representations 202 generated by the trained voice cloning system that have the target speech characteristic are used to train the untrained TTS system 300 to learn how to produce synthesized speech 202 having the target speech characteristic.

For each training audio signal 102 of the training data 10, the trained voice cloning system 200 generates a training synthesized speech representation 202 of the corresponding reference utterance spoken by the target speaker. Here, the training synthesized speech representation 202 includes the voice of the target speaker in a second accent/dialect different than the first accent/dialect of the training audio signals 102. That is, the trained voice cloning system 200 takes the training audio signal 102 corresponding to the reference utterance spoken by the target speaker in the first accent/dialect as input, and generates the training synthesized speech representation 202 of the training audio signal 102 in the second accent/dialect as output Thus, the trained voice cloning system 200 generates a corresponding training synthesized speech representation 202 for each of the plurality of training audio signals 102 of the training data 10 to create a plurality of training synthesized speech representations 202 for use in training the untrained TTS system 300. In some examples, the trained voice cloning system 200 determines the speaker characteristics of the training synthesized speech representation 202 from the speaker embedding/identifier 108.

In some implementations, when the trained voice cloning system 200 includes the TTS voice cloning system 200, the training data 10 includes a plurality of training text utterances 106 and the TTS voice cloning system 200 converts each training text utterance 106 into the training synthesized speech representation 202 in a target speech characteristic. The target speech characteristic may include the second accent/dialect. Alternatively, the target speech characteristic may include a target prosody/style. That is, the TTS voice cloning system 200 may produce training synthesized speech representations 202 from text alone. Accordingly, the training text utterances 106 may correspond to unspoken text utterances that are not paired from any corresponding audio signal of human speech. As such, the unspoken text utterances could be derived manually or from a language model. The TTS voice cloning system 200 may also receive a speaker embedding/identifier 108 that conditions the TTS voice cloning system 200 to clone the voice of the target speaker to produce training synthesized speech representations 202 in the voice of the target speaker and having the target speech characteristic. The TTS voice cloning system 200 may also receive a target speech characteristic identifier that identifies a target speech characteristic. For instance, the target speech characteristic identifier may include an accent/dialect identifier 109 identifying a target accent/dialect (e.g., second accent/dialect) of the resulting training synthesized speech representations 202 and/or include a prosody/style identifier (i.e., utterance embedding 204) that indicates a target prosody/style of the resulting training synthesized speech representation 202.

For each training audio signal 102 of the training data 10, the untrained TTS system 300 trains based on the corresponding transcript 106 of the training audio signal 102 and the corresponding training synthesized speech representation 202 output from the trained voice cloning system 200 that includes the voice of the targets speaker in the second dialect/language. More specifically, training the untrained TTS system 300 may include, for each training audio signal 102 of the training data 10, training both a TTS model 400 and a synthesizer 150 of the untrained TTS system 300 to learn how to generate synthesized speech from input text such that the synthesized speech clones the voice of the target speaker in the second dialect/accent. That is, the TTS system 300, including the TTS model 400 and the synthesizer 150, is trained to produce synthesized speech 152 that matches each training synthesized speech representation 202. During training, the TTS system 300 may learn to predict utterance embeddings 204 for the training synthesized speech representation 202. Here, each utterance embedding 204 may represent prosody information and/or accent/dialect information associated with the training synthesized speech representation 202 the TTS system 300 aims to replicate. Moreover, multiple TTS systems 300, 300A-N may train on training synthesized speech representation 202 output form the trained voice cloning system 200. Here, each TTS system 300 trains on a corresponding set of training synthesized speech representations 202 that may include voices of different target speaker, different speaking styles/prosodies, and/or different accent/dialect. Thereafter, each of the multiple trained TTS systems 300 are configured to generate expressive speech 152 for a respective target voice in a corresponding accent/dialect. The computing device 120 may store each trained TTS system 300 on data storage 180 (e.g., memory hardware 124) for later use during inference.

During inference, the computing device 120 may use the trained TTS system 300 to synthesize an input text utterance 320 into expressive speech 152 that clones the voice of the target speaker in a target accent/dialect (or conveying some other target speech characteristic in addition to or in lieu of the target accent/dialect). In particular, a TTS model 400 of the trained TTS system 300 may obtain conditioning inputs including a speaker embedding/identifier 108 that represents voice characteristics of the target speaker and an accent/dialect identifier 109 that identifies the intended accent/dialect (e.g., British English or American English). Conditioning inputs could further include a speaking prosody/style identifier representing a particular speaking style vertical that the resulting synthesized speech 152 should include. The TTS model 400, conditioned on the speaker embedding/identifier 108 and accent/dialect identifier 109, processes the input text utterance 320 to generate an output audio waveform 402. Here, the speaker embedding/identifier 108 includes speaker characteristics of the target speaker and the accent/dialect identifier 109 includes the target accent/dialect (e.g., American English, British English, etc.). The output audio waveform 402 conveys the target accent/dialect and the voice characteristics of the target speaker to enable the speech synthesizer 150 to generate the synthetic speech 152 from the output audio waveform 402. The TTS model 400 may also generate a number of predicted frames 280 corresponding to the output audio waveform 402.

Figure 2A:
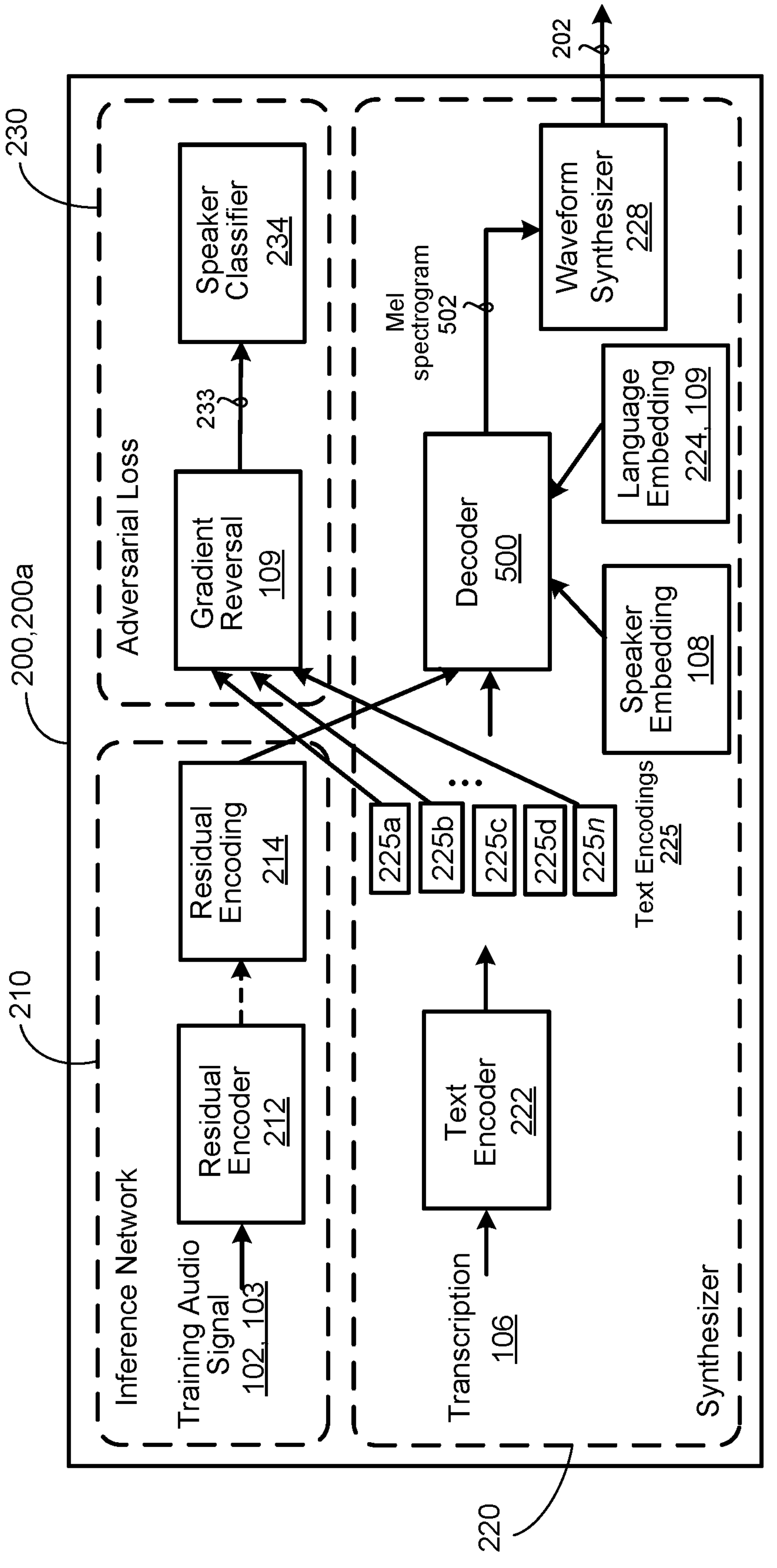
FIGS. 2A and 2B are schematic views of example trained speech cloning systems of FIG. 1.

FIG. 2A shows an example of the trained voice cloning system 200, 200*a* of the system 100. The trained voice cloning system 200*a* receives a training audio signal 102 corresponding to a reference utterance spoken by the targets speaker in a first accent/dialect and a corresponding transcription 106 of the reference utterance, and generates a training synthesized speech representation 202 that clones the voice of the target speaker in a second accent/dialect different than the first accent/dialect. The trained voice cloning system 200*a* includes an inference network 210, a synthesizer 220, and an adversarial loss module 230. The inference network 210 includes a residual encoder 212 that is configured to consume the input training audio signal 102 corresponding to the reference utterance spoken by the target speaker in the first accent/dialect and outputs a residual encoding 214 of the training audio signal 102. The training audio signal 102 may include mel spectrogram representations. In some examples, a feature representation (i.e., mel spectrogram sequence) is extracted from the training audio signal 102 and provided as input to the residual encoder 212 to generate the corresponding residual encoding 214 therefrom.

The synthesizer 220 includes a text encoder 222, speaker embeddings/identifier 108, language embeddings 224, a decoder neural network 500, and a waveform synthesizer 228. The text encoder 222 may include an encoder neural network having a convolutional subnetwork and a bidirectional long short-term memory (LSTM) layer. The decoder neural network 500 is configured to receive, as input, outputs 225 from the from the text encoder 222, the speaker embedding/identifier 108, and the language embedding 224 to generate an output mel spectrogram 502. The speaker embedding/identifier 108 may represent voice characteristics of the targets speaker and the language embedding 224 may specify language information associated with at least one of a language of the training audio signal, a language of the training synthesized speech utterance 204 to be produced, accent/dialect identifiers 109 identifying the accent/dialects associated with the training audio signal 102 and the training synthesized speech representation. Finally, the waveform synthesizer 228 may convert the mel spectrograms 502 output from the decoder neural network 500 into a time-domain waveform (e.g., training synthesized speech representation 202). The training synthesized speech representation 202 includes the voice of the target speaker in the second accent/dialect different than the first accent/dialect spoken in the reference utterance of the training data by the same target speaker. Accordingly, the voice cloning system 200*a* outputs training synthesized speech representations 202 that retain the voice of the target speaker that spoke the reference utterance in the first accent/dialect and convert the first accent/dialect spoken in the reference utterance into the second/accent dialect. Each training synthesized speech representation 202 generated by the voice cloning system 200*a* may also be associated with the language embedding 224, the accent/dialect identifier 109, and/or the speaker embedding/identifier 108 for use as conditioning inputs when training the TTS system 300 on the training synthesized speech representation 202. In some implementations, the waveform synthesizer 228 is a Griffin-Lim synthesizer. In some other implementations, the waveform synthesizer 228 is a vocoder. For instance, the waveform synthesizer 228 may include a WaveRNN vocoder. Here, the WaveRNN vocoder may generate 16-bit signals sampled at 24 kHz conditioned on spectrograms predicted by the trained voice cloning system 200. In some other implementations, the waveform synthesizer 228 is a trainable spectrogram to waveform inverter. After the waveform synthesizer 125 generates the waveform, an audio output system can generate the training synthesized speech representations 202 using the waveform. In some examples, a WaveNet neural vocoder replaces the waveform synthesizer 228. A WaveNet neural vocoder may provide different audio fidelity of the training synthesized speech representation 202 in comparison to the training synthesized speech representation 202 produced by the waveform synthesizer 228.

The text encoder 222 is configured to encode the corresponding transcription 106 of the training audio signal 102 into a sequence of text encodings 225, 225*a-n*. In some implementations, the text encoder includes an attention network that is configured to receive a sequential feature representation of the transcription 106 to generate a corresponding text encoding as a fixed-length context vector for each output step of the decoder neural network 500. That is, the attention network at the text encoder 222 may generate a fixed-length context vector 225, 225*a-n* for each frame of a mel spectrogram 502 that the decoder neural network 500 will later generate. A frame is a unit of the mel spectrogram 502 that is based on a small portion of the input signal, e.g., a 10 millisecond sample of the input signal. The attention network may determine a weight for each element of the text encoder 222 output and generate the fixed-length vector 225 by determining a weighted sum of each element. The attention weights may change for each decoder neural network 500 time step.

Accordingly, the decoder neural network 500 is configured to receive, as input, the fixed-length vectors (e.g., text encodings) 225 and generate as output a corresponding frame of a mel-frequency spectrogram 502. The mel-frequency spectrogram 502 is a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity.

In some implementations, the decoder neural network 500 includes an attention-based sequence-to-sequence model configured to generate a sequence of output log-mel spectrogram frames, e.g., output mel spectrogram 502, based on a transcription 106. For instance, the decoder neural network 500 may be based on the Tacotron 2 model (See "Natural TTS Synthesis by Conditioning WaveNet on Mel Spectrogram Predictions," by J. Shen, et al., at, e.g., https://arxiv.org/abs/1712.05884, which is incorporated herein by reference). The trained voice cloning system 200*a* provides an enhanced, multilingual trained voice cloning system that augments the decoder neural network 500 with additional speaker inputs (e.g., speaker embeddings/identifiers 108), and optionally, language embeddings 224, an adversarial-trained speaker classifier (e.g., speaker classifier 234), and a variational autoencoder-style residual encoder (e.g., the residual encoder 212).

The enhanced, trained voice cloning system 200*a*, that augments the attention-based sequence-to-sequence decoder neural network 500 with one or more of the speaker classifier 234, the residual encoder 212, the speaker embedding/identifiers 108, and/or the language embedding 224 notably provides many positive results. Namely, the trained voice cloning system 200*a* enables the use of a phonemic input representation for the transcriptions 106 to encourage sharing of model capacity across different natural languages and different accent/dialects, and incorporates an adversarial loss term 233 to encourage the trained voice cloning system 200*a* to disentangle how the trained voice cloning system 200*a* represents speaker identity, which perfectly correlates with the language used in the training data 10, from the speech content.

Figure 2B:
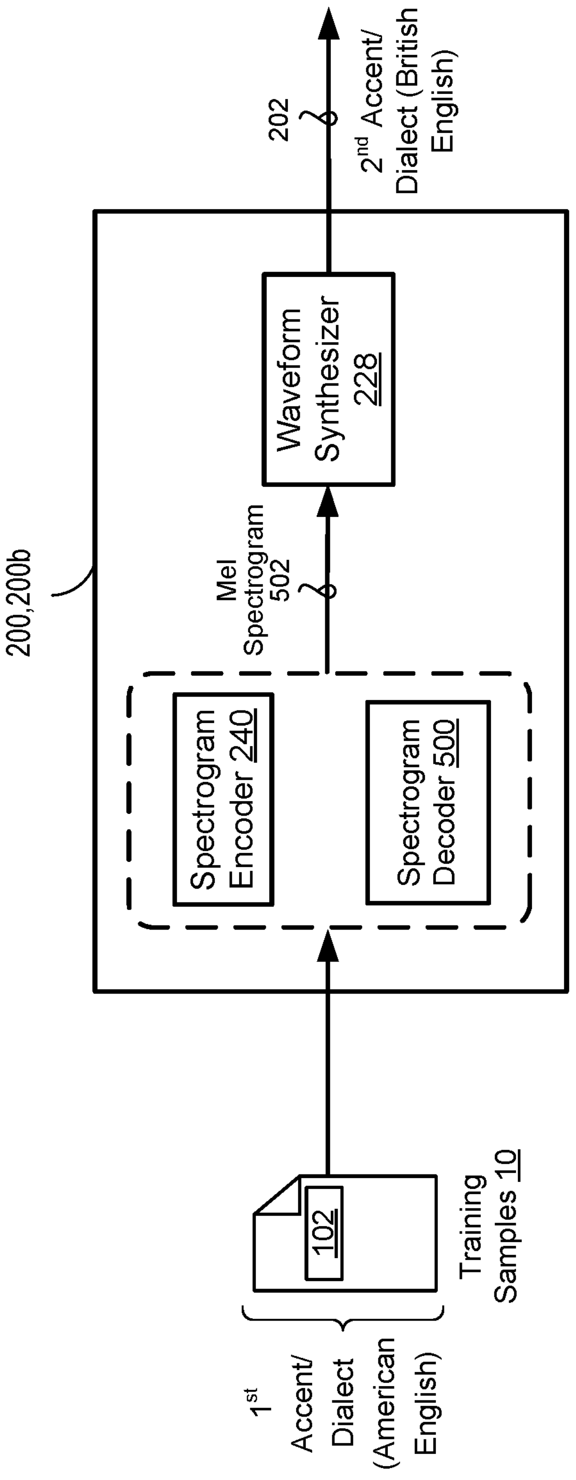

FIG. 2B illustrates an example trained voice cloning system 200, 200*b* configured to convert input training audio signal 102 corresponding to a reference utterance spoken by a target speaker in a first accent/dialect into an output mel-spectrogram 502 representing the voice of the target speaker in a second accent/dialect. That is, the trained voice cloning system 200*b* includes a speech-to-speech (S2S) conversion model. The training voice cloning system 200*b* is contrasted with the training voice cloning system 200*a* (FIG. 2A) that uses the corresponding transcription 106 as an input for generating the output mel-spectrogram 502. The S2S conversion model 200*b* is configured to convert the training audio signal 102 directly into the output mel-spectrogram 502 without performing speech recognition, or otherwise without requiring the generation of any intermediate discrete representations (e.g., text or phonemes) from the training audio signal 102. The S2S conversion model 200*b* includes a spectrogram encoder 240 configured to encode the training audio signal 102 into a hidden feature representation (e.g., a series of vectors) and a spectrogram decoder 500 configured to decode the hidden representation into the output mel-spectrogram 502. For instance, as the spectrogram decoder 500 receives the input training audio signal 102 corresponding to the reference utterance, the spectrogram decoder 500 may process give frames of audio and convert those five frames of audio to ten vectors. The vectors are not a transcription of the frames of training audio signal 102, but rather a mathematical representation of the frames of the training audio signal 102. In turn, the spectrogram decoder 500 may generate the output mel spectrogram 502 corresponding to the training synthesized speech representation based on the vectors received from the spectrogram encoder 240. For example, the spectrogram decoder 500 may receive the ten vectors from the spectrogram encoder 240 that represent the five frames of audio. Here, the spectrogram decoder 500 may generate five frames of the output mel spectrogram 502 corresponding to the speech representation of the reference utterance that includes the intended words or parts of words as the five frames of the training audio signal 102 in the second/accent dialect.

In some examples, the S2S conversion model 200*b* also includes a text decoder (not shown) that decodes the hidden representation into a textual representation, e.g., phonemes or graphemes. In these examples, the spectrogram decoder 500 and the text decoder may correspond to parallel decoding branches of the trained voice cloning system 200 that each receive the hidden representation encoded by the spectrogram encoder 240 and emit their respective one of the output mel spectrogram 502 or the textual representation in parallel. As with the TTS-based voice cloning system 200*a* of FIG. 2A, the S2S conversion system 200*b* may further include a waveform synthesizer 228, or alternatively a vocoder, to synthesize the output mel spectrogram 502 into a time-domain waveform for audible output. A time-domain audio waveform includes an audio waveform that defines an amplitude of an audio signal over time. The waveform synthesizer 228 may include a unit selection module or a WaveNet module for synthesizing the output mel spectrogram 502 into time-domain waveforms of training synthesized speech representations 202. In some implementations, the vocoder 228 i.e., neural vocoder, is separately trained and conditioned on mel-frequency spectrograms for conversion into time-domain audio waveforms (e.g., training synthesized speech representation 202).

In the example shown, the target speaker associated with the training data 10 speaks in a first accent/dialect (e.g., American English accent). The trained voice cloning system (e.g., S2S voice conversion model) 200*b* is trained to convert the training audio signal 102 of the training data 10 spoken in the first accent/dialect directly into training synthesized speech representations 202 including the voice of the target speaker in a second accent/dialect (e.g., British English accent). Without departing from the scope of the present disclosure, the trained voice cloning system 200*b* may be trained to convert training audio signal 102 corresponding to a reference utterance spoken by a target speaker in a first language or speaking style into training synthesized speech representations 202 that retain the voice of the target speaker but in a different second language or speaking style.

Figure 3:
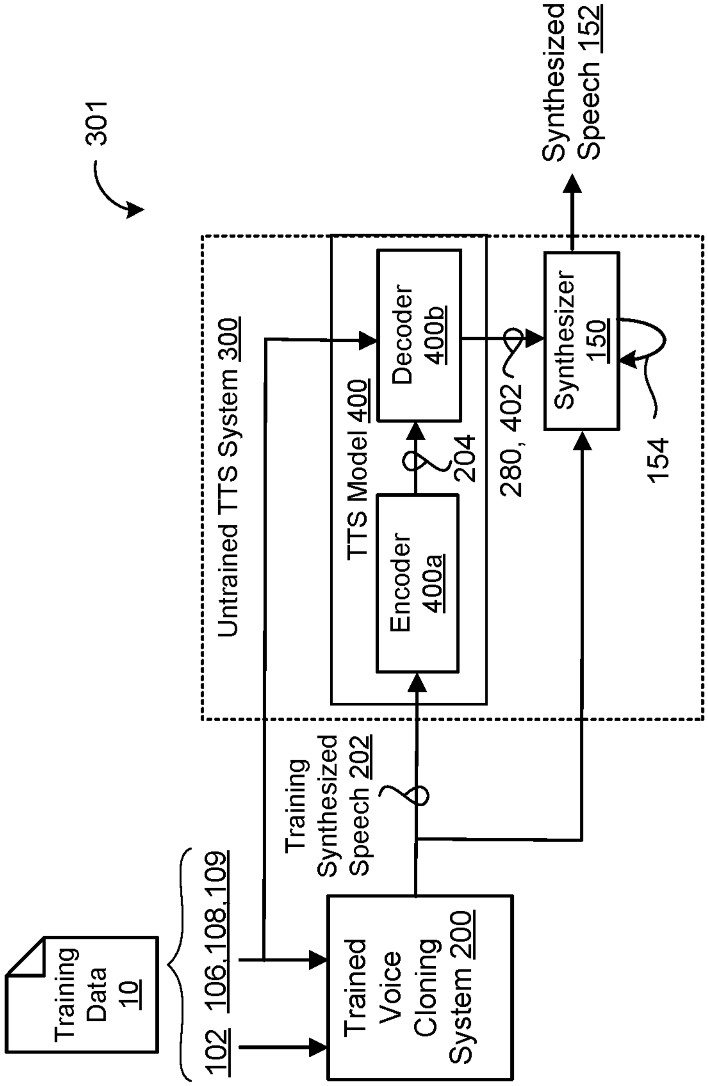
FIG. 3 is a schematic view of training a TTS model and a synthesizer of the TTS system of FIG. 1.

FIG. 3 illustrates an example training process 301 for training the TTS system 300 on training synthesized speech representations 202 generated by the trained voice cloning system 200. The trained voice cloning system 200 obtains the training data 10 including training audio signals 102 and corresponding transcripts 106. Each training signal 102 may be associated with the conditioning inputs that include the speaker embedding/identifiers 108 and the accent/dialect identifier 109. Here, the training audio signals 102 of the training data 10 represent human speech in a first accent/dialect (e.g., American English). Based on the training audio signal 102 (and optionally the corresponding transcript), the trained voice cloning system 200 is configured to generate a training synthesized speech representation 202 including the voice of the target speaker in a second accent/dialect different than the first accent/dialect. The training synthesized speech representation 202 may include an audio waveform or a sequence of mel-frequency spectrograms. The trained voice cloning system 200 provides the training synthesized speech representation 202 for training the untrained TTS model 300.

The untrained TTS system 300 includes a TTS model 400 and a synthesizer 150. The TTS model 400 includes an encoder portion 400*a* and a decoder portion 400*b*. The TTS model 400 may additionally include a variation layer. The encoder portion 400*a* is trained to learn how to encode the training synthesized speech representation 202 into a corresponding utterance embedding 204 that represents a prosody and/or the second accent/dialect captured by the training synthesized speech representation 202. During training, the decoder portion 400*b* is conditioned on the transcript 106 and the conditioning inputs (e.g., speaker embedding/identifiers 108 and accent/dialect identifier) and configured to decode the utterance embedding 204 encoded by the encoder portion 400*a* from the training synthesized speech representation 202 into a predicted output audio signal 402. During training, the decoder portion 400*b* receives the transcript 106 and the utterance embedding 204 of the training data to generate the predicted output audio signal. The goal of training is to minimize any loss between the predicted output audio signal 402 and the training synthesized speech representation 202. The decoder portion 400*b* may also generate a number of predicted frames 280 corresponding to the predicted output audio signal 402. That is, the decoder portion 400*b* decodes the utterance embedding 204 into the sequence of fixed-length predicted frames 280 (referred to interchangeably as 'predicted frames') that provide prosodic features and/or accent/dialect information. The prosodic features represent the prosody of the training synthesized speech representation 202 and include duration, pitch contour, energy contour, and/or mel-frequency spectrogram contour.

In some implementations, the synthesizer 150 is trained to learn how to generate a predicted synthesized speech representation 152 from the predicted number of frames 280 corresponding the predicted output audio signal 402 from the TTS model 400. Here, predicted synthesized speech representation clones the voice of the target speaker in the second accent/dialect and may further include the prosody captured by the training synthesized speech representation 202. More specifically, the synthesizer 150, like the TTS model 400, receives the training synthesized speech representation 202 output from the voice cloning system 200 as a ground-truth label to teach the synthesizer to 150 to generate the predicted synthesized speech representation 152 that matches the training synthesized speech representation 202. The synthesizer 150 generates gradients/losses 154 between the predicted synthesized speech representation 152 and the training synthesized speech representation 202 during training. In some examples, the synthesizer 150 back-propagates the gradients/losses 154 through the TTS model 400 and the synthesizer 150.

Once the TTS model 400 and the synthesizer of the TTS system 300 are trained, the trained TTS system 300 only applies the decoder portion 400*b* to generate synthesized speech 152 in the second accent/dialect from an input text utterance 320. That is, the decoder portion 400*b* may decode a selected utterance embedding 204 conditioned on the input text utterance 320 and the conditioning inputs 108, 109 into an output audio waveform 402 and corresponding predicted number of frames 280. Thereafter, the synthesizer 150 uses the predicted number of frames 280 to generate synthesized speech 152 that clones the voice of the target speaker in the second accent/dialect.

Figure 4A:
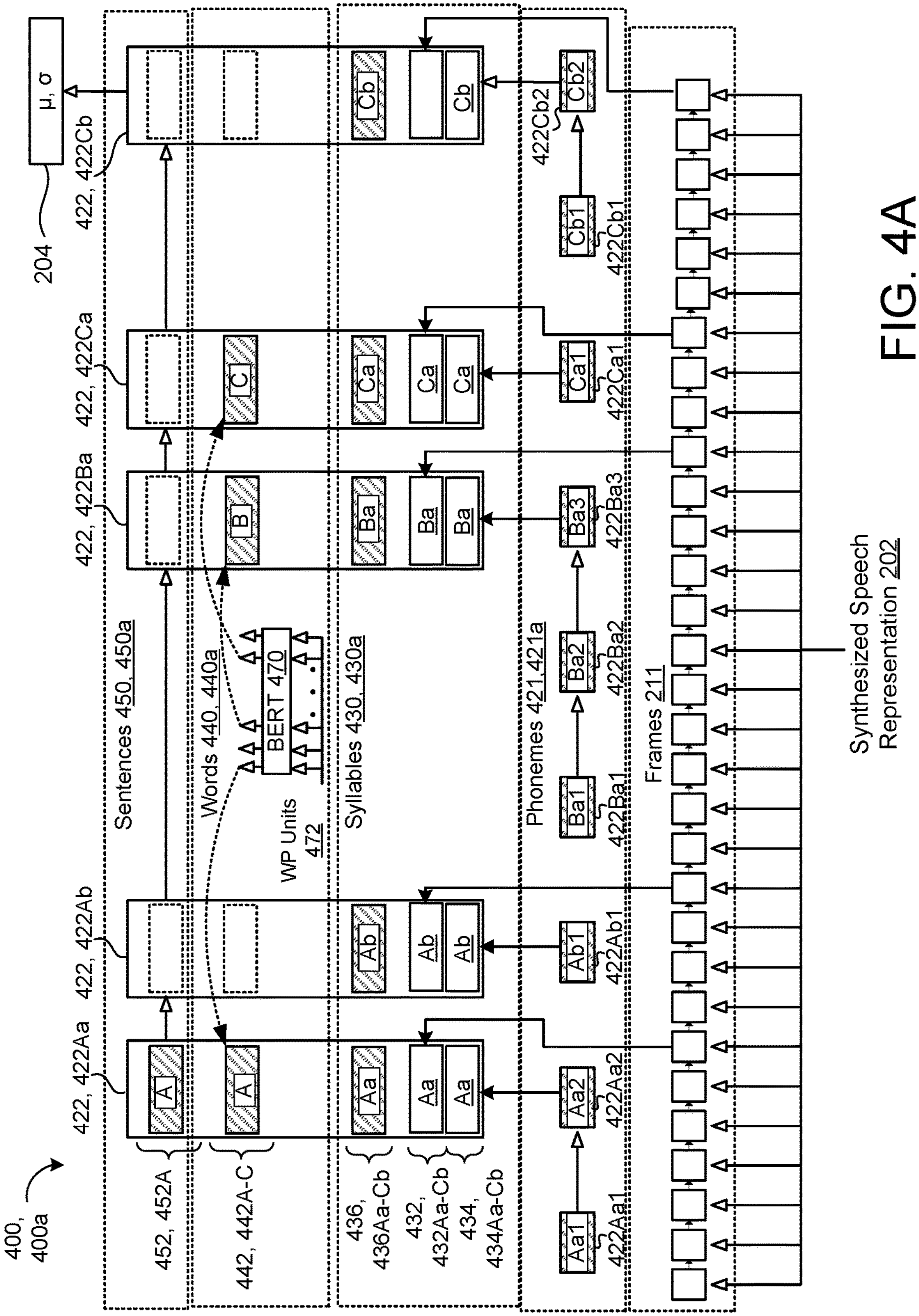
FIG. 4A is a schematic view of an encoder portion of the TTS model of FIG. 3.
Figure 4B:
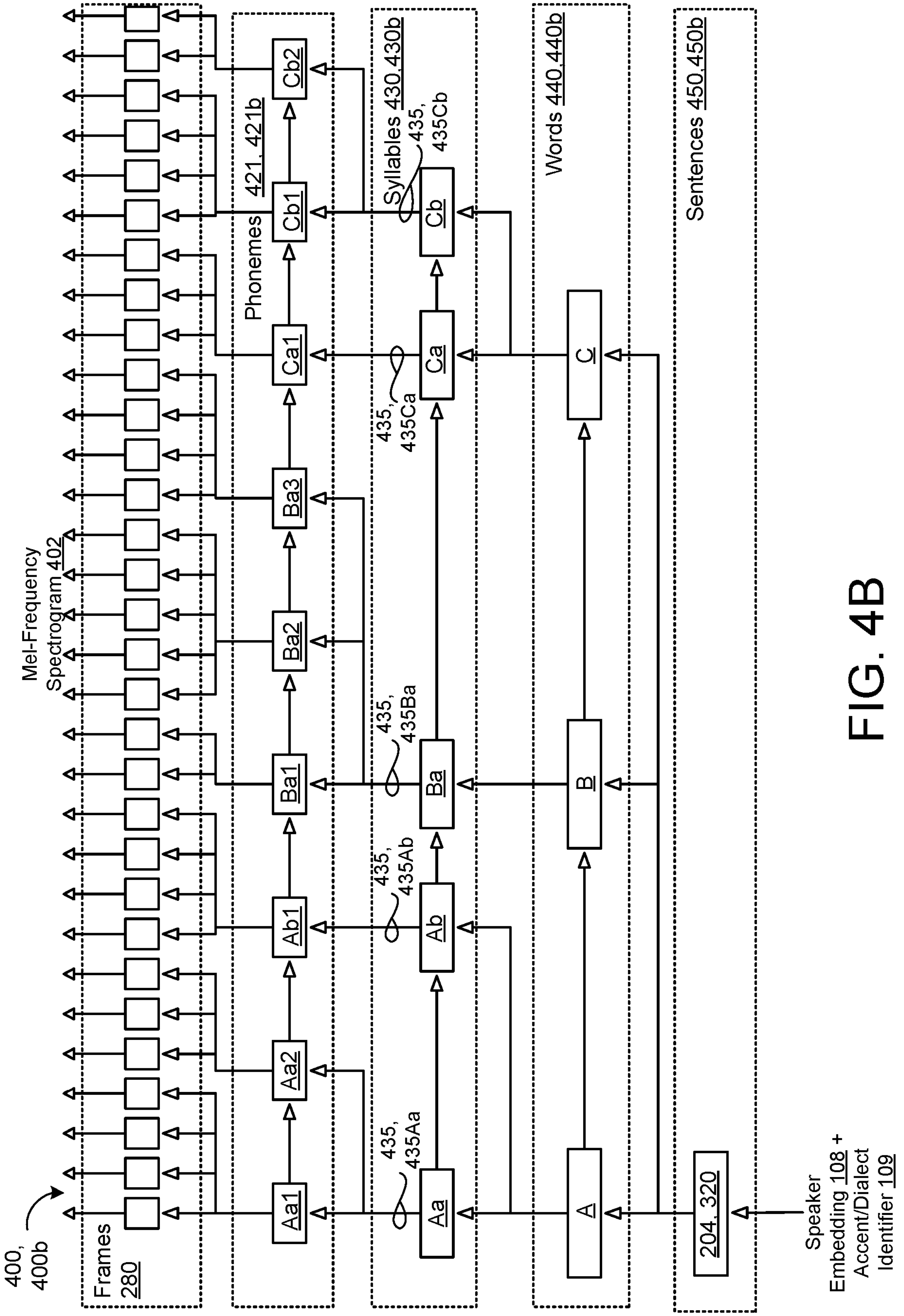
FIG. 4B is a schematic view of a decoder portion of the TTS model of FIG. 3.

FIGS. 4A and 4B show the TTS model 400 of FIG. 3 represented by a hierarchical linguistic structure for synthesizing an input text utterance 320 into expressive speech that clones the voice of the target speaker in the target accent/dialect. As will become apparent, the TTS model 400 may be trained to jointly predict, for each syllable of given input text utterance 320, a duration of the syllable and pitch (F0) and energy (C0) contours for the syllable without relying on any unique mapping from the given input text utterance or other linguistic specification to produce synthesized speech 152 having the target accent/dialect and in the voice of the target speaker.

During training, hierarchical linguistic structure of the TTS model 400 includes the encoder portion 400*a* (FIG. 4A)

that encodes a plurality of fixed-length reference frames 211 sampled from the training synthesized speech representation 202 into the fixed-length utterance embedding 204, and the decoder portion **400*b* (FIG. 4B) that learns how to decode the fixed-length utterance embedding 204. The decoder portion 400*b* may decode the fixed-length utterance embedding 204 into the output audio waveform 402 including a number of predicted frames 280 of expressive speech As will become apparent, the TTS model 400 is trained so that the number of predicted frames 280 output from the decoder portion 400*b* is equal to the number of reference frames 211 input to the encoder portion 400*a*. Moreover, the TTS model 400 is trained so that accent/dialect and prosody information associated with the reference frames 211 and predicted frames 280** substantially match one another.

Referring to FIGS. 3 and 4A, the encoder portion **400*a* receives the sequence of fixed-length reference frames 211 sampled from the synthesized speech representation 202 output from the trained voice cloning system 200. The training synthesized speech representation 202 includes the voice of the target speaker in the target accent/dialect. The reference frames 211 may include a duration of 5 milliseconds (ms) and represent one of a contour of pitch (F0) or a contour of energy (C0) (and/or contour of spectral characteristics (M0)) for the synthesized speech representation 202. In parallel, the encoder portion 400*a* may also receive a second sequence of reference frames 211 each including a duration of 5 ms and representing the other one of the contour of pitch (F0) or the contour of energy (C0) (and/or contour of spectral characteristics (M0)) for the synthesized speech representation 202. Accordingly, the sequence of reference frames 211 sampled from the synthesized speech representation 202 provide a duration, pitch contour, energy contour, and/or spectral characteristics contour to represent the target accent/dialect and/or prosody of the synthesized speech representation 202. The length or duration of the synthesized speech representation 202 correlates to a sum of the total number of reference frames 211**.

The encoder portion **400*a* includes hierarchical levels of reference frames 211, phonemes 421, 421*a*, syllables 430, 430*a*, words 440, 440*a*, and sentences 450, 450*a* for the synthesized speech representation 202 that clock relative to one another. For instance, the level associated with the sequence of reference frames 211 clocks faster than the next level associated with the sequence of phonemes 421. Similarly, the level associated with the sequence of syllables 430 clocks slower than the level associated with the sequence of phonemes 421 and faster than the level associated with the sequence of words 440**. Accordingly, the slower clocking layers receive, as input, an output from the faster clocking layers so that the output after the final clock (i.e., state) of a faster later is taken as the input to the corresponding slower layer to essentially provide a sequence-to-sequence encoder. In the examples shown, the hierarchical levels include Long Short-Term Memory (LSTM) levels.

In the example shown, the synthesized speech representation 202 includes one sentence 450, 450A with three words 440, 440A-C. The first word 440, 440A includes two syllables 430, 430Aa-Ab. The second word 440, 440B incudes one syllable 430, 430Ba. The third word 440, **440*a* includes two syllables 430, 430Ca-Cb. The first syllable 430, 430Aa of the first word 440, 440A includes two phonemes 421, 421Aa1-Aa2. The first syllable 430, 430Ba of the second word 440, 440B includes three phonemes 421, 421Ba1-Ba3. The first syllable 430, 430Ca of the third word 440, 440C incudes one phoneme 421, 421Ca1. The second syllable 430, 430Cb of the third word 440, 440C includes two phonemes 421, 421Cb1-Cb2**.

In some implementations, the encoder portion **400*a* first encodes the sequence of reference frames 211 into frame-based syllable embeddings 432, 432Aa-Cb. Each frame-based syllable embedding 432 may indicate reference prosodic features represented as a numerical vector indicative of a duration, pitch (F0), and/or energy (C0) associated with the corresponding syllable 430. In some implementations, the reference frames 211 define a sequence of phonemes 421Aa1-421Cb2. Here, instead of encoding a subset of reference frames 211 into one or more phonemes, the encoder portion 400*a* instead accounts for the phonemes 421 by encoding phone level linguistic features 422, 422Aa1-Cb2 into phone feature-based syllable embeddings 434, 434Aa-Cb. Each phoneme-level linguistic feature 422 may indicate a position of the phoneme, while each phoneme feature-based syllable embedding 434 includes a vector indicating the position of each phoneme within the corresponding syllable 430 as well as the number of phonemes 421 within the corresponding syllable 430. For each syllable 430, the respective syllable embeddings 432, 434 may be concatenated and encoded with the respective syllable-level linguistic features 436, 436Aa-Cb for the corresponding syllable 430. Moreover, each syllable embedding 432, 434 is indicative of a corresponding state for the level of syllables 430**.

With continued reference to FIG. 4A, the blocks in the hierarchical layers that include a diagonal hatching pattern correspond to linguistic features (except for the word level 440) for a particular level of the hierarchy. The hatching pattern at the word-level 440 includes word embeddings 442 extracted as linguistic features from the input text utterance 320 (during inference) or WP embeddings 442 output from the bidirectional encoder representations from transformers (BERT) model 470 based on word units 472 obtained from the transcript 106. Since the recurrent neural network (RNN) portion of the encoder **400*a* has no notion of wordpieces, the WP embeddings 442 corresponding to the first wordpeice of each word may be selected to represent the word which may contain one or more syllables 430. With the frame-based syllable embeddings 432 and the phone feature-based syllable embeddings 434, the encoder portion 400*a* concatenates and encodes these syllable embeddings 432, 434 with other linguistic features 436, 453, 442 (or WP embeddings 442). For example, the encoder portion 400*a* encodes the concatenated syllable embeddings 432, 434 with syllable-level linguistic features 436, 436Aa-Cb, word-level linguistic features (or WP embeddings 432, 432A-C output from the BERT model 470), and/or sentence level linguistic features 452, 452A. By encoding the syllable embeddings 432, 434 with the linguistic features 436, 452, 442 (or WP embeddings 442), the encoder portion 400*a* generates an utterance embedding 204 for the synthesized speech representation 202. The utterance embedding 204 may be stored in the data storage 180 (FIG. 1) along with the transcription 106 (e.g., textual representation) of the synthesized speech representation 202. From the training data 10, the linguistic features 432, 442, 452 may be extracted and stored for use in conditioning the training of the hierarchical linguistic structure. The linguistic features (e.g., linguistic features 422, 436, 442, 452) may include, without limitation, individual sounds for each phoneme and/or the position of each phoneme in a syllable, whether each syllable is stressed or un-stressed, syntactic information for each word, and whether the utterance is a question or phrase and/or a gender of a speaker of the utterance. As used herein, any reference of word-level linguistic feature 442 with respect to the encoder and decoder portions 400***a*, 400*b* of the TTS model 400 can be replaced with WP embeddings from the BERT model 470.

In the example of FIG. 4A, encoding blocks 422, 422Aa-Cb are shown to depict the encoding between the linguistic features 436, 442, 452 and the syllable embeddings 432, 434. Here, the blocks 422 are sequence encoded at a syllable rate to generate the utterance embedding 204. As an illustration, the first block 422Aa is fed as input into a second block 422Ab. The second block 422Ab is fed as an input into a third block 422Ba. The third block 422Ba is fed as an input into the fourth block 422Ca. The fourth block 422Ca is fed into the fifth block 422Cb. In some configurations, the utterance embedding 204 includes a mean μ and the standard deviation σ are with respect to the training data of multiple training synthesized speech representations 202.

In some implementations, each syllable 430 receives, as input, a corresponding encoding of a subset of references frames 211 and includes a duration equal to the number of reference frames 211 in the encoded subset. In the example shown, the first seven fixed-length reference frames 211 are encoded into syllable 430Aa; the next four fixed-length reference frames 211 are encoded into syllable 430Ab; the next eleven fixed-length references frames 211 are encoded into syllable 430Ba; the next three fixed-length reference frames 211 are encoded into syllable 430Ca; and the final six fixed-length reference frames 211 are encoded into syllable 430Cb. Thus, each syllable 430 in the sequence of syllables 430 may include a corresponding duration based on the number of reference frames 211 encoded into the syllable 430 and corresponding pitch and/or energy contours. For instance, syllable 430Aa includes a duration equal to 35 ms (i.e., seven reference frames 211 each having the fixed-length of five milliseconds) and syllable 430Ab includes a duration equal to 20 ms (i.e., four reference frames 211 each having the fixed-length of five milliseconds). Thus, the level of reference frames 211 clocks a total of ten times for a single clocking between the syllable 430Aa and the next syllable 430Ab at the level of syllables 430. The duration of the syllables 430 may indicate timing of the syllables 430 and pauses in between adjacent syllables 430.

In some examples, the utterance embedding 204 generated by the encoder portion 400*a* is a fixed-length utterance embedding 204 that includes a numerical vector representing an accent/dialect and/or prosody of the synthesized speech representation 202. In some examples, the fixed-length utterance embedding 204 includes a numerical vector having a value equal to "128" or "256."

Referring now to FIGS. 3 and 4B, during training the decoder portion 400*b* of the TTS model 400 is configured to produce a plurality of fixed-length syllable embeddings 435 by initially decoding the fixed-length utterance embedding 204 that specifies the target accent/dialect and prosody for the transcript 106. More specifically, the utterance embedding 204 represents the target accent/dialect and prosody possessed by the synthesized speech representation 202 output from the trained voice cloning system 200. Moreover, the decoder portion 400*b* decodes the fixed-length utterance embedding 204 associated with the transcript 106 using the received speaker embedding/identifier 108 that indicates the voice characteristics of the target speaker and/or the accent/dialect identifier 109 that indicates the target accent/dialect for the resulting synthesized speech 152. Thus, the decoder portion 400*b* is configured to back-propagate the utterance embedding 204 to generate the plurality of fixed-length predicted frames 280 that closely match the plurality of fixed-length reference frames 211 encoded by the encoder portion 400*a* of FIG. 4A. For instance, fixed-length predicted frames 280 for both pitch (F0) and energy (C0) may be generated in parallel to represent the target accent/dialect (e.g., predicted accent) that substantially matches the target accent/dialect prosody possessed by the training synthesized speech representation 202. In some examples, the speech synthesizer 150 uses the fixed-length predicted frames 280 to produce the synthesized speech 152 that clones the voice of the target speaker in the intended accent/dialect based on the fixed-length utterance embedding 204. For instance, a unit selection module or a WaveNet module of the speech synthesizer 150 may use the number of predicted frames 280 to produce the synthesized speech 152 having the intended accent and/or intended prosody. Notably, and as mentioned previously, the intended accent/dialect produced in the synthesized speech 152 includes an accent/dialect that is not native to the target speaker and not spoken by the target speaker in any of the reference utterances of the training data 10.

In the example shown, the decoder portion 400*b* decodes the utterance embedding 204 received from the encoder portion 400*a* into hierarchical levels of words 440, 440*b*, syllables 430, 430*b*, phonemes 421, 421*b*, and fixed-length predicted frames 280. Specifically, the fixed-length utterance embedding 204 corresponds to a variational layer of hierarchical input data for the decoder portion 400*b* and each of the stacked hierarchical levels include Long Short-Term Memory (LSTM) processing cells variably clocked to a length of the hierarchical input data. For instance, the syllable level 430 clocks faster than the word level 440 and slower than the phoneme level 421. The rectangular blocks in each level correspond to LSTM processing cells for respective words, syllables, phonemes, or frames. Advantageously, the trained voice cloning system 200 gives the LSTM processing cells of the word level 440 memory over the last 1000 words, gives the LSTM cells of the syllable level 430 memory over the last 100 syllables, gives the LSTM cells of the phoneme level 421 memory over the last 100 phonemes, and gives the LSTM cells of the fixed-length pitch and/or energy frames 280 memory over the last 100 fixed-length frames 280. When the fixed-length frames 280 include a duration (e.g., frame rate) of five milliseconds each, the corresponding LSTM processing cells provide memory over the last 500 milliseconds (e.g., a half second).

In the example shown the decoder portion 400*b* of the hierarchical linguistic structure simply back-propagates the fixed-length utterance embedding 204 encoded by the encoder portion 400*a* into the sequence of three words 440A-440C, the sequence of five syllables 430Aa-430Cb, and the sequence of nine phonemes 421Aa1-421Cb2 to generate the sequence of predicted fixed-length frames 280. The decoder portion 400*b* is conditioned upon linguistic features of the training data 10 during training and the input text utterance 320 during inference. By contrast to the encoder portion 400*a* of FIG. 4A where outputs from faster clocking layers are received as inputs by slower clocking layers, the decoder portion 400*b* includes outputs from slower clocking layers feeding faster clocking layers such that the output of a slower clocking layer is distributed to the input of the faster clocking layer at each clock cycle with a timing signal appended thereto. Additional details of the TTS model 400 are described with reference to U.S patent application Ser. No. 16/867,427, filed on May 5, 2020, the contents of which are incorporated by reference in their entirety.

Referring to FIG. 4B, in some implementations, the hierarchical linguistic structure for the TTS model 400 is adapted to provide a controllable model for predicting mel spectral information for an input text utterance 320 during inference, while at the same time effectively controlling the accent/dialect and prosody implicitly represented in the mel spectral information. Specifically, the TTS model 400 may predict a mel-frequency spectrogram 502 for the input text utterance and provide the mel-frequency spectrogram 502 as input to a vocoder network 155 of the speech synthesizer 150 for conversion into a time-domain audio waveform. A time-domain audio waveform includes an audio waveform that defines an amplitude of an audio signal over time. As will become apparent, the speech synthesizer 150 can generate synthesized speech 152 from the input text utterance 320 using the TTS system 300 trained on sample transcripts 106 and training synthesized speech representation 202 output from the trained voice cloning system 200. That is, the TTS system 300 does not receive complex linguistic and acoustic features that require significant domain expertise to produce, but rather is able to convert input text utterances 320 to mel-frequency spectrograms 502 using an end-to-end deep neural network. The vocoder network 155, i.e., neural vocoder, may be separately trained and conditioned on mel-frequency spectrograms for conversion into tie-domain audio waveforms.

A mel-frequency spectrogram includes a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. The vocoder network 155 can be any network that is configured to receive mel-frequency spectrograms and generate audio output samples based on the mel-frequency spectrograms. For example, the vocoder network 155 can be based on the parallel feed-forward neural network described in van den Oord, *Parallel WaveNet: Fast High-Fidelity Speech Synthesis*, available at https://arxiv.org/pdf/1711.10433.pdf, and incorporated herein by reference. Alternatively, the vocoder network 155 can be an autoregressive neural network.

Figure 5:
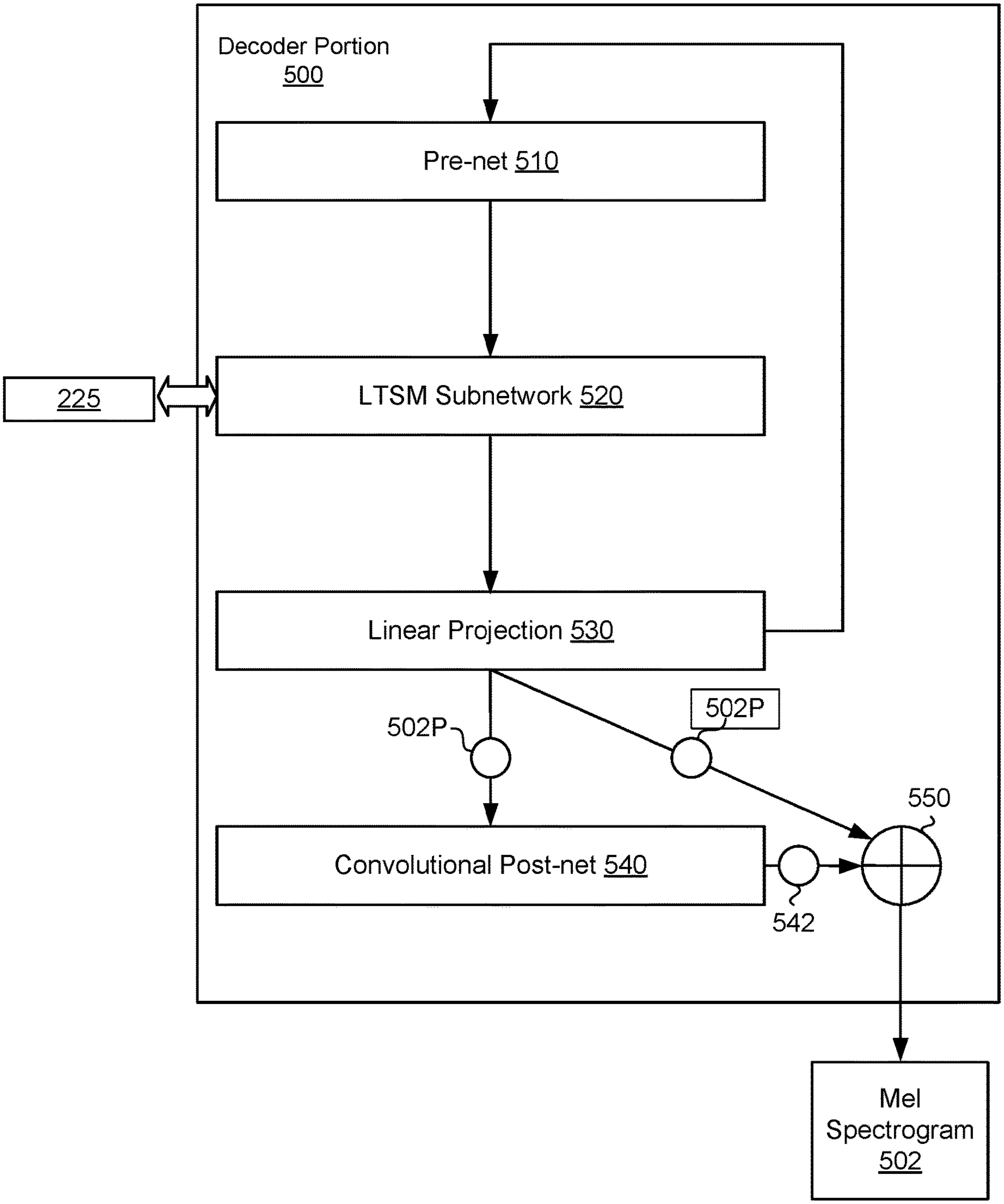
FIG. 5 is a schematic view of a spectrogram decoder of the trained speech cloning system of FIG. 2B.

Referring now to FIG.5, the spectrogram decoder 500 (interchangeably referred to as decoder portion 500) of the trained voice cloning system 200 may include an architecture having a pre-net 510, a Long Short-Term Memory (LSTM) subnetwork 520, a linear projection 530, and a convolutional post-net 540. The pre-net 510, through which a mel-frequency prediction for a previous time step passes, may include two fully-connected layers of hidden rectified linear units (ReLUs). The pre-net 510 acts as an information bottleneck for learning attention to increase convergence speed and to improve generalization capability of the speech synthesis system during training. In order to introduce output variation, dropout with probability 0.5 may be applied to later in the pre-net 510.

The LSTM subnetwork 520 may include two or more LSTM layers. At each time step, the LSTM subnetwork 520 receives a concatenation of the output of the pre-net 510, the fixed-length context vector 225 (e.g., the text encoding output from the encoder of FIGS. 2A and 2B) is projected to a scalar and passed through a sigmoid activation to predict that the output sequence of mel spectrograms 502 has completed. The LSTM layers may be regularized using zoneout with probability of, for example, 0.1. The linear projection receives as input the output of the LSTM subnetwork 520 and produces a prediction of a mel-frequency spectrogram 502, 502P.

The convolutional post-net 540 with one or more convolutional layers processes the predicted mel-frequency spectrogram 502P for the time step to predict a residual 542 to add to the predicted mel-frequency spectrogram 502P at adder 550. This improves the overall reconstruction. Each convolutional layer except for the final convolutional layer may be followed by batch normalization and hyperbolic tangent (TanH) activations. The convolutional layers are regularized using dropout with a probability of, for example, 0.5. The residual 542 is added to the predicted mel-frequency spectrogram 502P generated by the linear projection 520, and the sum (i.e., the mel-frequency spectrogram 502) may be provided to the speech synthesizer 150. In some implementations, in parallel to the decoder portion 500 predicting mel-frequency spectrograms 502 for each time step, a concatenation of the output of the LSTM subnetwork 520, [the utterance embedding], and the portion of the training data 10 (e.g., a character embedding generated by a text encoder (not shown)) is projected to a scalar and passed through a sigmoid activation to predict the probability that the output sequence of mel frequency spectrograms 502 has completed. The output sequence mel-frequency spectrograms 502 corresponds to the training synthesized speech representation 202 for the training data 10 and includes the intended prosody and intended accent of the target speaker.

This "stop token" prediction is used during inference to allow the trained voice cloning system 200 to dynamically determine when to terminate generation instead of always generating for a fixed duration. When the stop token indicates that generation has terminated, i.e., when the stop token probability exceeds a threshold value, the decoder portion 500 stops predicting mel-frequency spectrograms 502P and returns the mel-frequency spectrograms predicted up to that point as the training synthesized speech representation 202. Alternatively, the decoder portion 500 may always generate mel-frequency spectrograms 502 of the same length (e.g., 10 seconds).

Figure 6:
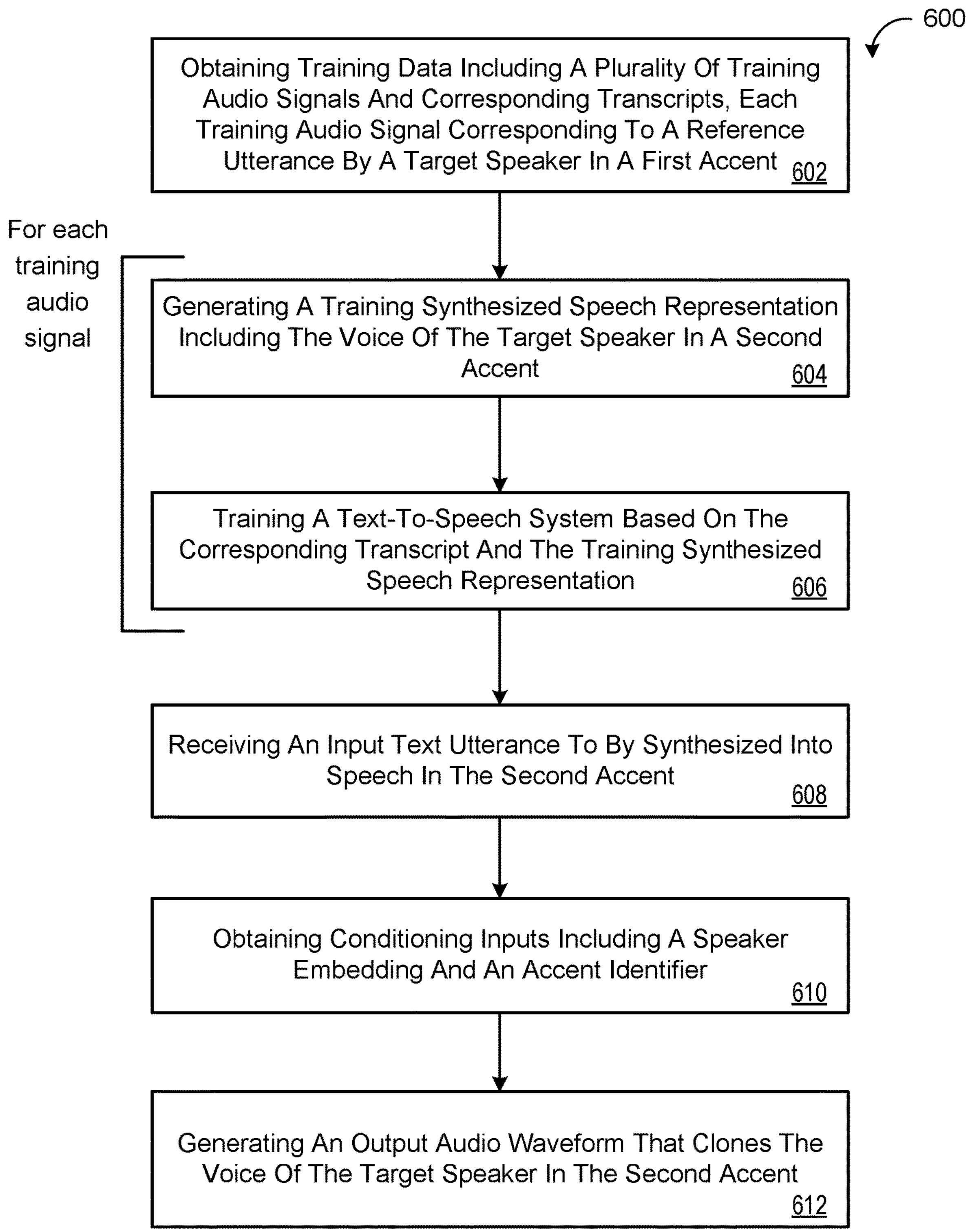
FIG. 6 is a flowchart of an example arrangement of operations for a method of synthesizing an input text utterance into expressive speech having an intended accent/dialect and a voice of a target speaker.

FIG. 6 is a flowchart of an exemplary arrangement of operations for a method 600 of synthesizing an input text utterance into expressive speech having an intended accent/dialect and cloning a voice of a target speaker 432. The data processing hardware 122 (FIG. 1) may execute the operations for the method 600 by executing instructions stored on the memory hardware 124. At operation 602, the method 600 includes obtaining training data 10 including a plurality of training audio signals 102 and corresponding transcripts 106. Each training audio signal 102 corresponds to a reference utterance spoken by a target speaker in a first accent/dialect. Each transcript 106 includes a textual representation of the corresponding reference utterance. For each training audio signal 102 of the training audio signals 102, the method 600 performs operations 604 and 606. At operation 604, the method 600 includes generating, by a trained voice cloning system 200 configured to receive the training audio signal 102 corresponding to the reference utterance spoken by the target speaker in the first accent/dialect as input, a training synthetic speech representation 202 of the corresponding reference utterance spoken by the target speaker. Here, the training synthesized speech representation 202 includes a voice of the target speaker in a second accent/dialect that is different than the first accent/dialect. At operation 606, the method 600 includes training a text-to-speech (TTS) system 300 based on the corresponding transcript 106 of the training audio signal 102 and the training synthesized speech representation 202 of the corresponding reference utterance generated by the trained voice cloning system 200.

At operation 608, the method 600 includes receiving an input text utterance 320 to be synthesized into expressive speech 152 in the second accent/dialect. At operation 610, the method 600 includes obtaining conditioning inputs including a speaker embedding/identifier 108 that represents voice characteristics of the target speaker and an accent/dialect identifier 109 that identifies the second accent/dialect. At operation 612, the method 600 includes generating, using the trained TTS system 300 conditioned on the obtained conditioning inputs, by processing the input text utterance 320 an output audio waveform 402 corresponding to a synthesized speech representation 202 of the input text utterance 320 that clones the voice of the target speaker in the second accent/dialect.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
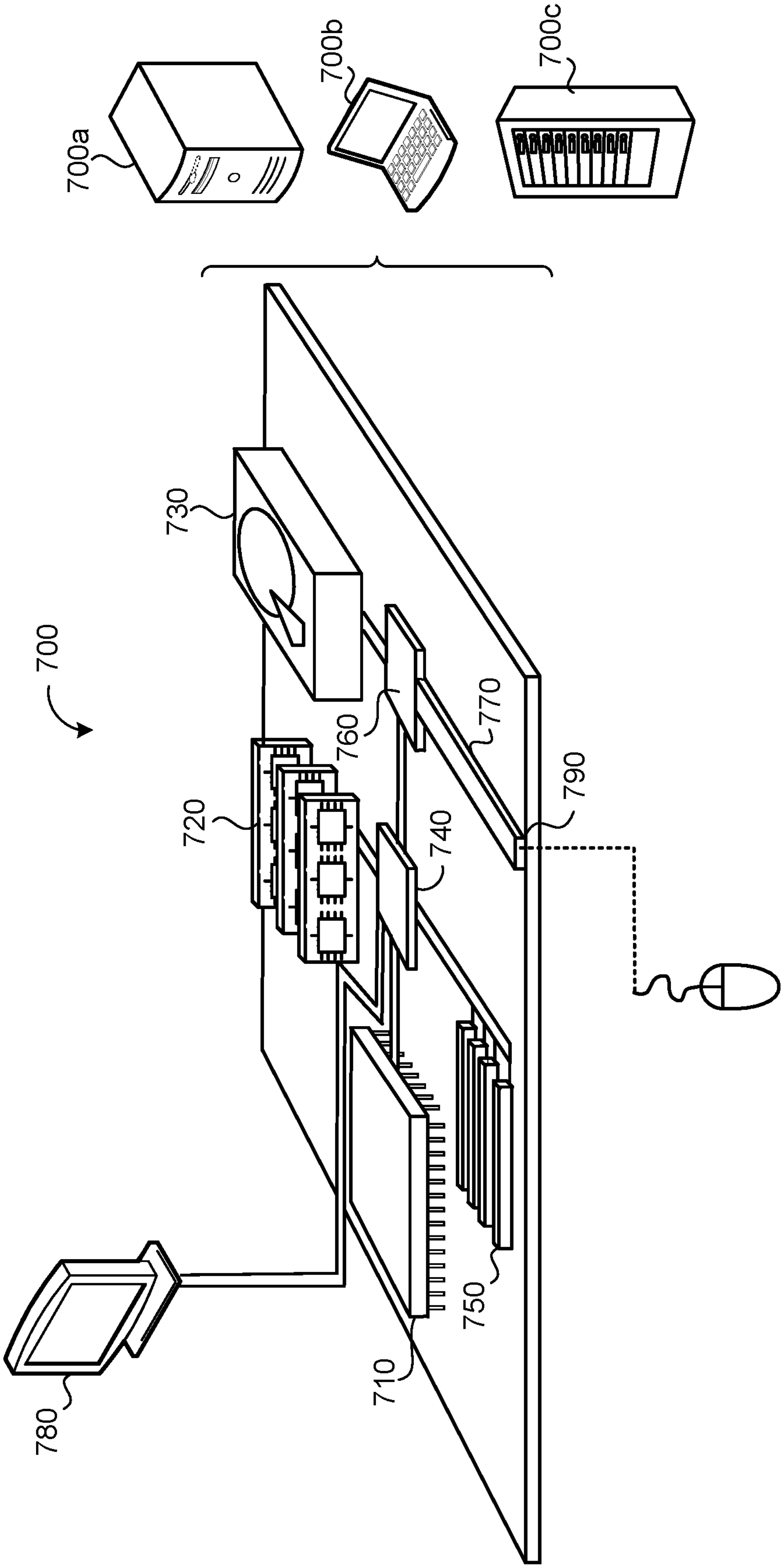
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:

obtaining training data including a plurality of training audio signals and corresponding transcripts, each training audio signal corresponding to a reference utterance spoken by a target speaker in a first accent/dialect, each transcript comprising a textual representation of the corresponding reference utterance;

for each training audio signal of the training data:

generating, by a trained voice cloning system trained to generate synthesized speech that clones a voice of the target speaker in a second accent/dialect different than the first accent/dialect and configured to receive the training audio signal corresponding to the reference utterance spoken by the target speaker in the first accent/dialect as input, a training synthesized speech representation of the corresponding reference utterance spoken by the target speaker in the first accent/dialect, the training synthesized speech representation comprising an output audio waveform of synthesized speech that clones the voice of the target speaker in the second accent/dialect different than the first accent/dialect;

outputting, from the trained voice cloning system, the training synthesized speech representation comprising the output audio waveform of synthesized speech that clones the voice of the target speaker in the second accent/dialect different than the first accent/dialect;

obtaining a text-to-speech (TTS) system different than the trained voice cloning system, the TTS system not trained to generate synthesized speech that clones the voice of the target speaker in the second accent/dialect; and training the TTS system to learn to generate synthesized speech that clones the voice of the target speaker in the second accent/dialect based on the corresponding transcript of the training audio signal and the training synthesized speech representation of the corresponding reference utterance output from the trained voice cloning system;

receiving an input 616text utterance to be synthesized into speech in the second accent/dialect;

obtaining conditioning inputs comprising a speaker embedding representing voice characteristics of the target speaker and an accent/dialect identifier identifying the second accent/dialect; and generating, using the trained TTS system conditioned on the obtained conditioning inputs, by processing the input text utterance, an output audio waveform corresponding to a synthesized speech representation of the input text utterance that clones the voice of the target speaker in the second accent/dialect.

2. The computer-implemented method of claim 1, wherein training the TTS system comprises:

training an encoder portion of a TTS model of the TTS system to encode the training synthesized speech representation of the corresponding reference utterance generated by the trained voice cloning system into an utterance embedding representing a prosody captured by the training synthesized speech representation; and training, using the corresponding transcript of the training audio signal, a decoder portion of the TTS system by decoding the utterance embedding to generate a predicted output audio signal of expressive speech.

3. The computer-implemented method of claim 2, wherein training the TTS system further comprises:

training, using the predicted output audio signal, a synthesizer of the TTS system to generate a predicted synthesized speech representation of the input text utterance, the predicted synthesized speech representation cloning the voice of the target speaker in the second accent/dialect and having the prosody represented by the utterance embedding;

generating gradients/losses between the predicted synthesized speech representation and the training synthesized speech representation; and back-propagating the gradients/losses through the TTS model and the synthesizer.

4. The computer-implemented method of claim 2, wherein the operations further comprise:

sampling, from the training synthesized speech representation, a sequence of fixed-length reference frames providing reference prosodic features that represent the prosody captured by the training synthesized speech representation, wherein training the encoder portion of the TTS model comprises training the encoder portion to encode the sequence of fixed-length reference frames sampled from the training synthesized speech representation into the utterance embedding.

5. The computer-implemented method of claim 4, wherein training the decoder portion of the TTS model comprises decoding, using the corresponding transcript of the training audio signal, the utterance embedding into a sequence of fixed-length predicted frames providing predicted prosodic features for the transcript that represent the prosody represented by the utterance embedding.

6. The computer-implemented method of claim 5, wherein the TTS model is trained so that a number of fixed-length predicted frames decoded by the decoder portion is equal to a number of fixed-length reference frames sampled from the training synthesized speech representation.

7. The computer-implemented method of claim 1, wherein the training synthesized speech representation of the reference utterance comprises a training audio waveform or a sequence of mel-frequency spectrograms.

8. The computer-implemented method of claim 1, wherein the trained voice cloning system is further configured to receive the corresponding transcript of the training audio signal as input when generating the training synthesized speech representation.

9. The computer-implemented method of claim 1, wherein:

the training audio signal corresponding to the reference utterance spoken by the target speaker comprises an input audio waveform of human speech; and the trained voice cloning system comprises an end-to-end neural network configured to convert input audio waveforms directly into corresponding output audio waveforms.

10. The computer-implemented method of claim 1, wherein the TTS system comprises:

a TTS model conditioned on the conditioning inputs and configured to generate an output audio signal of expressive speech by decoding, using the input text utterance, an utterance embedding into a sequence of fixed-length predicted frames providing prosodic features, the utterance embedding selected to specify an intended prosody for the input text utterance and the prosodic features representing the intended prosody specified by the utterance embedding; and a waveform synthesizer configured to receive, as input, the sequence of fixed-length predicted frames and generate, as output, the output audio waveform corresponding to the synthesized speech representation of the input text utterance that clones the voice of the target speaker in the second accent/dialect.

11. The computer-implemented method of claim 10, wherein the prosodic features representing the intended prosody comprise duration, pitch contour, energy contour, and/or mel-frequency spectrogram contour.

12. A system comprising data processing hardware;

memory hardware in communication with the data processing hardware and storing instructions, that when executed by the data processing hardware, cause the data processing hardware to perform operations comprising:

obtaining training data including a plurality of training audio signals and corresponding transcripts, each training audio signal corresponding to a reference utterance spoken by a target speaker in a first accent/dialect, each transcript comprising a textual representation of the corresponding reference utterance;

for each training audio signal of the training data:

generating, by a trained voice cloning system configured to receive the training audio signal corresponding to the reference utterance spoken by the target speaker in the first accent/dialect as input, a training synthesized speech representation of the corresponding reference utterance spoken by the target speaker, the training synthesized speech representation comprising an output audio waveform of synthesized speech that clones a voice of the target speaker in a second accent/dialect different than the first accent/dialect;

outputting, from the trained voice cloning system, the training synthesized speech representation comprising the output audio waveform of synthesized speech that clones the voice of the target speaker in the second accent/dialect different than the first accent/dialect;

obtaining a text-to-speech (TTS) system different than the trained voice cloning system, the TTS system not trained to generate synthesized speech that clones the voice of the target speaker in the second accent/dialect; and training the TTS system to learn to generate synthesized speech that clones the voice of the target speaker in the second accent/dialect based on the corresponding transcript of the training audio signal and the training synthesized speech representation of the corresponding reference utterance output from the trained voice cloning system;

receiving an input text utterance to be synthesized into speech in the second accent/dialect;

obtaining conditioning inputs comprising a speaker embedding representing voice characteristics of the target speaker and an accent/dialect identifier identifying the second accent/dialect; and generating, using the trained TTS system conditioned on the obtained conditioning inputs, by processing the input text utterance, an output audio waveform corresponding to a synthesized speech representation of the input text utterance that clones the voice of the target speaker in the second accent/dialect.

13. The system of claim 12, wherein training the TTS system comprises:

training an encoder portion of a TTS model of the TTS system to encode the training synthesized speech representation of the corresponding reference utterance generated by the trained voice cloning system into an utterance embedding representing a prosody captured by the training synthesized speech representation; and training, using the corresponding transcript of the training audio signal, a decoder portion of the TTS system by decoding the utterance embedding to generate a predicted output audio signal of expressive speech.

14. The system of claim 13, wherein training the TTS system further comprises:

training, using the predicted output audio signal, a synthesizer of the TTS system to generate a predicted synthesized speech representation of the input text utterance, the predicted synthesized speech representation cloning the voice of the target speaker in the second accent/dialect and having the prosody represented by the utterance embedding;

generating gradients/losses between the predicted synthesized speech representation and the training synthesized speech representation; and back-propagating the gradients/losses through the TTS model and the synthesizer.

15. The system of claim 13, wherein the operations further comprise:

sampling, from the training synthesized speech representation, a sequence of fixed-length reference frames providing reference prosodic features that represent the prosody captured by the training synthesized speech representation, wherein training the encoder portion of the TTS model comprises training the encoder portion to encode the sequence of fixed-length reference frames sampled from the training synthesized speech representation into the utterance embedding.

16. The system of claim 15, wherein training the decoder portion of the TTS model comprises decoding, using the corresponding transcript of the training audio signal, the utterance embedding into a sequence of fixed-length predicted frames providing predicted prosodic features for the transcript that represent the prosody represented by the utterance embedding.

17. The system of claim 16, wherein the TTS model is trained so that a number of fixed-length predicted frames decoded by the decoder portion is equal to a number of fixed-length reference frames sampled from the training synthesized speech representation.

18. The system of claim 12, wherein the training synthesized speech representation of the reference utterance comprises a training audio waveform or a sequence of mel-frequency spectrograms.

19. The system of claim 12, wherein the trained voice cloning system is further configured to receive the corresponding transcript of the training audio signal as input when generating the training synthesized speech representation.

20. The system of claim 12, wherein:

the training audio signal corresponding to the reference utterance spoken by the target speaker comprises an input audio waveform of human speech; and the trained voice cloning system comprises an end-to-end neural network configured to convert input audio waveforms directly into corresponding output audio waveforms.

21. The system of claim 12, wherein the TTS system comprises:

a TTS model conditioned on the conditioning inputs and configured to generate an output audio signal of expressive speech by decoding, using the input text utterance, an utterance embedding into a sequence of fixed-length predicted frames providing prosodic features, the utterance embedding selected to specify an intended prosody for the input text utterance and the prosodic features representing the intended prosody specified by the utterance embedding; and a waveform synthesizer configured to receive, as input, the sequence of fixed-length predicted frames and generate, as output, the output audio waveform corresponding to the synthesized speech representation of the input text utterance that clones the voice of the target speaker in the second accent/dialect.

22. The system of claim 21, wherein the prosodic features representing the intended prosody comprise duration, pitch contour, energy contour, and/or mel-frequency spectrogram contour.

23. A computer-implemented method when executed on data processing hardware causes the data processing hardware to perform operations comprising:

obtaining training data including a plurality of training text utterances;

for each training text utterance of the training data:

generating, by a trained voice cloning system configured to receive the training text utterance as input, a training synthesized speech representation of the corresponding training text utterance, the training synthesized speech representation comprising an output audio waveform of synthesized speech that clones a voice of a target speaker and having a target speech characteristic;

obtaining a text-to-speech (TTS) system different than the trained voice cloning system, the TTS system not trained to generate synthesized speech that clones the voice of the target speaker and having the target speech characteristic; and training, based on the corresponding training text utterance and the training synthesized speech representation generated by the trained voice cloning system, the TTS system to learn how to generate synthesized speech having the target speech characteristic;

receiving an input text utterance to be synthesized into speech having the target speech characteristic; and generating, using the trained TTS system a synthesized speech representation of the input text utterance, the synthesized speech representation having the target speech characteristic.

24. The computer-implemented method of claim 23, wherein the operations further comprise obtaining conditioning inputs comprising a speaker identifier indicating voice characteristics of the target speaker, wherein:

when generating the synthesized speech representation of the input text utterance, the trained TTS system is conditioned on the obtained conditioning inputs, and the synthesized speech representation having the target speech characteristic clones the voice of the target speaker.

25. The computer-implemented method of claim 23, wherein the target speech characteristic comprises a target accent/dialect.

26. The computer-implemented method of claim 23, wherein the target speech characteristic comprises a target prosody/style.

27. The computer-implemented method of claim 23, wherein when generating the training synthesized speech representation of the corresponding training text utterance, the trained voice cloning system is further configured to receive a speaker identifier indicating voice characteristics of the target speaker.

* * * * *